2 Sheets--Sheet 1.

W. KELLY.

Improvement in Molds and Cores for Casting Steel.

No. 5,637. Reissued Oct. 28, 1873.

*Inventor.*

T. C. Bright
John Tyler

William Kelly
By his Atty Wm Christison

2 Sheets--Sheet 2.

W. KELLY.

Improvement in Molds and Cores for Casting Steel.

No. 5,637. Reissued Oct. 28, 1873.

Witnesses:
T. C. Brecht.
John. Tyler

Inventor.
William Kelly
By his Atty Wm. Ouchterlone

UNITED STATES PATENT OFFICE.

WILLIAM KELLY, OF LOUISVILLE, KENTUCKY, ASSIGNOR OF ONE-HALF INTEREST TO THOMAS C. COLEMAN.

IMPROVEMENT IN MOLDS AND CORES FOR CASTING STEEL.

Specification forming part of Letters Patent No. 132,837, dated November 5, 1872; reissue No. 5,637, dated October 28, 1873; application filed January 21, 1873.

*To all whom it may concern:*

Be it known that I, WILLIAM KELLY, of Louisville, in the county of Jefferson and State of Kentucky, have invented certain new and and useful Improvements in Making Steel Castings; and I do hereby declare that the following is a full and exact description thereof, reference being had to the accompanying drawings making a part of this application.

My invention relates to the manufacture of steel castings; and has for its objects to avoid porosity in castings that are quickly chilled, and at the same time so construct the molds that they may facilitate the process of casting; and to these ends my invention consists in the employment, in combination with a copper mold or flask, or the equivalent of copper, of cores of sand or its equivalent—such as black lead, dried clay, or spring-metal rings—as will be hereinafter set forth. My invention further consists in providing the flask with a removable or detachable gate and closing-tongs, as and for the purposes presently to be explained.

It is frequently desirable, in making steel castings, to employ a copper flask, on account of its peculiar properties for conducting off the heat; but, as the shrinkage is so rapid that, in many cases, it envelops portions of the mold, and renders the separation of the casting therefrom without injury to one or both impossible, to avoid this difficulty I conceived the idea of providing the mold with sand (or equivalent) cores, and have found, from practical experience, that the result is successful. I have also devised a novel means for operating the cope and drag sides of the flask by the use of tongs, and making the drag half of the gate detachable, which, when secured in the manner hereinafter explained, is perfectly operative, and yet the operation of detaching it serves to open the flask and lift the casting out.

To enable those skilled to more fully understand my invention, I will proceed to describe the same, referring to the accompanying drawings, in which—

Figure 1:
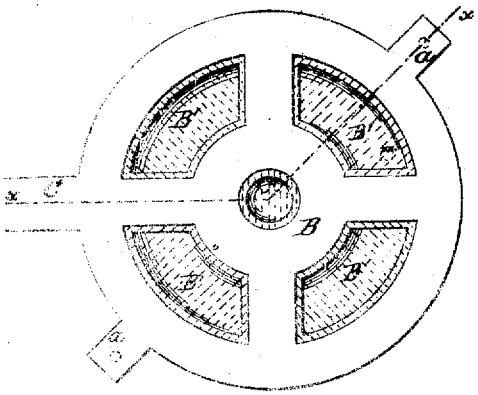
Figure 2:
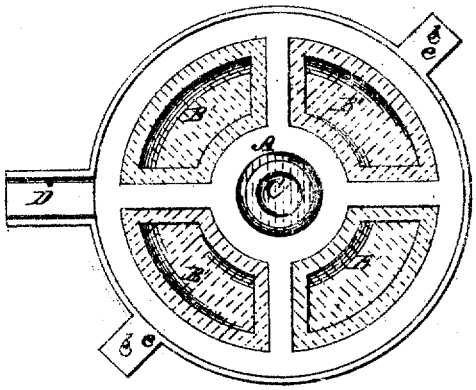
Figure 4:
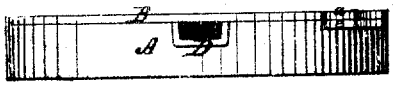
Figure 5:
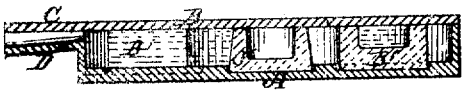
Figure 3:
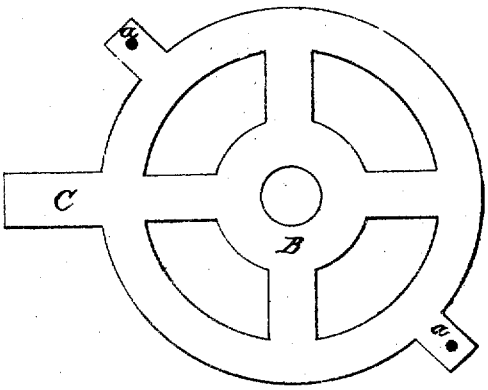
Figure 6:
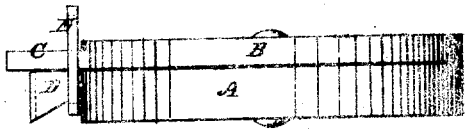
Figure 7:
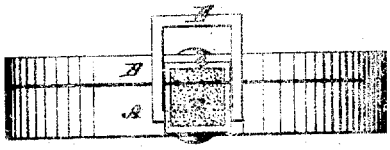
Figure 8:
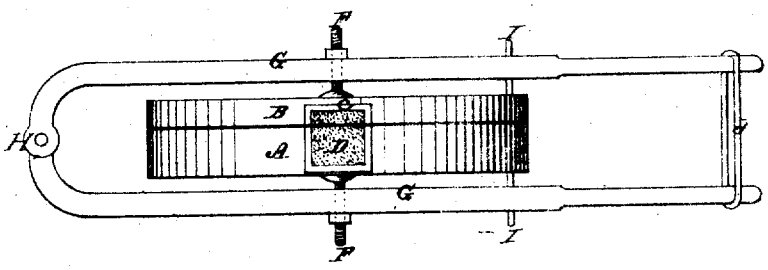

Figure 1 is a top view of a copper mold for making an ordinary spoked wheel. Fig. 2 is a similar view with the cope removed. Fig. 3 is a top view of the cope. Fig. 4 is a side view of the mold, looking into the gate; Fig. 5, a section at the line *x x*, Fig. 1; Fig. 6, a side view of a mold with the drag side of the gate detachable from the drag, and supported by a stirrup. Fig. 7 is a front view of the same; and Fig. 8 is a similar view with the stirrup removed, and the mold provided with the opening and closing tongs.

Similar letters indicate like parts in the several views.

A represents a copper mold, adapted to cast a spoked wheel. B is the cope or cover, provided with ears *a a*, having pin-holes therein, and adapted to lie over pins *b b* on corresponding ears *e e* on the drag side of the mold. The cope extends over the gate, forming the upper or cover portion C thereof. D is the gate, which is shown in all the figures on Sheet 1 as a part of the drag as at present made, while the figures on Sheet 2 illustrate the peculiarities embraced in the second part of my invention. The spaces between the parts of the mold which are intended to form the spokes of the wheel are filled with sand-cores B (or cores of any other suitable shrinkable material) which I have found advisable to make shell-like or hollow. C′ is a similar core for making the hole in the center of the hub. In casting rapid castings in copper molds the casting is liable to become attached to the gate, and sometimes the whole flask is destroyed in the endeavor to separate it therefrom. To remedy this difficulty I construct the gate separate, and secure it in its proper relation to the flask by means of a stirrup, E, which is adapted to slide over the cope side C of the gate, and allow the same to have a free vertical play of about an inch, more or less. This space is closed by a binding-wedge, or otherwise, during the pouring operation, thus holding the gate in position; or, the stirrup may extend down to the plane of the bottom of the flask, or be secured temporarily in any other suitable way. The central portion of each half of the flask is provided with a connecting-rod or screw-bolt, F, adapted to be secured to the legs of a pair of tongs, G, which are pivoted at H, and provided with a locking-link, J. Steadying-pins I I are arranged on the outer edge of each half of the mold, as shown, to prevent the same from turning in the tongs.

When the tongs are closed the pressure is central, thus effectually closing the two halves of the flask. The tongs are held temporarily tight by the locking-link J. After the pour has been completed the link J is removed, and the upper leg of the tongs G opened slightly. This will remove partially the cope from the casting, and by a continued movement of the tongs the cope is elevated until the portion C comes in contact with the upper part of the stirrup and lifts it upward, which in turn lifts the casting from its bed.

I do not wish to be understood as claiming, broadly, the combination of copper in a sand or other suitable mold for making steel castings, as this has already been patented by me.

What I claim, and desire to secure by Letters Patent, is—

1. In combination with a copper flask or mold, or the equivalent of copper, the employment of sand, spring-metal, or any other suitable yielding cores, substantially as and for the purposes set forth.

2. The detachable gate and stirrup, substantially as and for the purpose set forth.

3. The tongs, center fastenings, and steady-pins, substantially as and for the purpose set forth.

WM. KELLY. [L. S.]

Witnesses:
JOS. CARROLL.
R. B. COTTER.